Patented Aug. 19, 1941

2,252,709

UNITED STATES PATENT OFFICE 2,252,709

ERYTHRAMINE AND PROCESS FOR ITS PRODUCTION

Karl Folkers, Plainfield, and Frank Koniuszy, Rahway, N. J., assignors to Merck & Co. Inc., Rahway, N. J., a corporation of New Jersey No Drawing. Application September 28, 1938, Serial No. 232,234

12 Claims. (Cl. 260—236)

This invention relates to methods for the isolation and purification of erythramine and its salts from a physiologically active alkaloidal free fraction obtained from parts of certain species of the genus Erythrina.

In a co-pending application Serial No. 360,922 filed October 12, 1940, there is disclosed a process for the production of an active alkaloidal free fraction from various species of the genus Erythrina, which acts selectively to paralyze the motor nerve endings of striated muscle, a typical curare-like action. It further discloses that the active free fraction from a particular species is comprised of a number of individual alkaloids which exhibit similar pharmacological properties but which exhibit different physical and chemical properties and that for this reason it was necessary to develop special methods of isolation and purification for each individual alkaloid.

According to the said co-pending application, several methods may be employed for obtaining the active free fraction. In many cases, the inert alkaloid hypaphorine occurs with the new physiologically active alkaloidal free fraction, and, if present, may be separated from the crude material before the latter is treated for the production of the active substance. This may be accomplished by separating out any fatty materials, acidulating the "clarified" material and crystallizing out the corresponding hypaphorine salt. The material remaining after the hypaphorine separation may then be slightly alkalinized and further processed for the production of the physiologically active alkaloidal free fraction.

According to the preferred method, however, the selected starting material may be free from any fatty material inherent therein, and the residue may then be made slightly alkaline, after which it is extracted with an immiscible solvent for the direct production of the physiologically active alkaloidal free fraction.

For the extraction of the physiologically active alkaloidal free fraction from the alkaline solution, the immiscible organic solvent chloroform is preferred.

The solvent to be employed for removing the fatty substances is petroleum ether. Any traces of the active alkaloidal free fraction removed with the fatty substances may be recovered by extraction with dilute aqueous acid.

Also, in treating the seeds, it has been found that the alkaloidal free fraction may be obtained by treating the ground seeds or defatted ground seeds with water. The treated material is concentrated to crystallize hypaphorine, and the residue is then worked up for the production of the active principles.

In treating the bark of roots, stems, or flowers, the resinous substances may be separated out together with the active alkaloidal free fraction, by extracting with methyl alcohol, or ethyl alcohol, and the resinous substances precipitated by treatment with water. Acidulated water may be used for the separation of the alkaloidal free fraction and the resinous substances, and the resinous substances may be then removed by concentration and filtration.

The genus Erythrina may be divided into several sections or groups, each of which comprises several species which bear a certain botanical relationship to each other and which contain essentially the same alkaloids.

The species mentioned herein are examples of species from certain sections of species which contain preponderant quantities of the alkaloid erythramine. It is to be understood that species not mentioned, which bear certain botanical relationships to those species mentioned, may be worked for the extraction of erythramine by the methods herein shown. Likewise, it is to be understood that these methods apply for the transitional species of Erythrina, in which the amount of erythramine is small when compared to the amount of the accompanying alkaloids.

The present application is a continuation-in-part of the above-mentioned co-pending application, and is directed to special processes for the production of the individual alkaloid, erythramine, from the total free alkaloidal fraction obtained from a certain group of species of the genus Erythrina.

The erythramine may be obtained in the form of a hydrohalide from the crude active free fraction from certain species of Erythrina, and when so obtained, the erythramine hydrohalide is generally moderately pure. The hydrohalide is then purified by recrystallization until pure.

Crystalline erythramine showed M. P. 103–104

$$(\alpha)_D^{29} + 227.6°$$

abs. ethanol. It was obtained from a pure hydrohalide and recrystallized from a petroleum ether and diethyl ether mixture.

Erythramine exhibits a strong paralyzing effect on the motor system, similar to curare, and possesses properties which render it entirely suitable for use as substitutes for curare. They exhibit greatly increased activity over the crude extracts known to the art.

The isolation of the erythramine from the crude active free alkaloidal fraction is described herein for *E. sandwicensis* Deg., and *E. subumbrans* (Hassk.), Merrill.

The following examples are given to illustrate the manner in which the alkaloids may be isolated.

*Examples*

I. The crude active free alkaloidal fraction obtained from the seeds of *Erythrina sandwicensis* Deg., according to the methods described herein, is dissolved in about three parts of absolute ethanol and treated with the calculated quantity of sodium iodide and glacial acetic acid. The amount and degree of dryness of the ethanol was adjusted so that the sodium acetate remained dissolved. After standing many hours at 10°, the solution is filtered and the crude erythramine hydriodide is obtained. Such salt generally melted at about 244° with decomposition. It was recrystallized from absolute ethanol until the melting was constant at 249°. This melting point or decomposition point varies somewhat with the rate of heating. A second crop is obtained from the original mother liquor by addition of a little absolute ether which may be purified in the same manner. Erythramine hydriodide showed $$(\alpha)_D^{26} + 220.0°$$

$c = 0.500$, water.

II. *Erythrina subumbrans* (Hask.) Merrill is treated according to the process described in Example I above, for the production of erythramine hydriodide.

III. The crude active alkaloidal free fraction obtained from the seeds of *Erythrina sandwicensis* Deg., according to the methods herein described, was dissolved in one part of absolute ethanol and treated with the calculated amount of aqueous 40% hydrobromic acid. The recrystallized pure erythramine hydrobromide showed a melting point of 228° C. with decomposition, and $$(\alpha)_D^{26} + 203.2°$$

in water.

IV. The free erythramine base is obtained by dissolving a salt, for example the hydriodide, in water, adding sodium bicarbonate until the solution is alkaline and extracting with chloroform. After distilling the solvent in vacuo, the erythramine is obtained generally as a viscous gum. It may be distilled at $3.9 \times 10^{-4}$ mm. and 125° as a gum, or it may be recrystallized from a petroleum ether and diethyl ether mixture. The crystals melted at 103–104° after drying to an anhydrous condition.

We claim:

1. A process for the production of crystalline erythramine an alkaloid obtainable from certain botanically related species of Erythrina, said alkaloid having a melting point of about 103–140° C. and $$[\alpha]_D^{29} + 227.6°$$

in absolute ethanol, in the form of salts from the active free alkaloidal fraction obtained from *Erythrina sandwicensis* Deg. which comprises the steps of dissolving the said alkaloidal fraction in absolute alcohol, treating the solution with the appropriate acidulating agent selected from the group consisting of hydriodic acid and hydrobromic acid, and crystallizing the erythramine salt from the liquor.

2. A process for the production of crystalline erythramine an alkaloid obtainable from certain botanically related species of Erythrina, said alkaloid having a melting point of about 103–104° C. and $$[\alpha]_D^{29} + 227.6°$$

in absolute ethanol, in the form of salts from the active free alkaloidal free fraction obtained from *Erythrina sandwicensis* Deg. which comprises the steps of dissolving the said alkaloidal fraction in absolute alcohol, treating the solution with sodium iodide and glacial acetic acid and crystallizing the erythramine salt from the liquor.

3. A process for the production of crystalline erythramine an alkaloid obtainable from certain botanically related species of Erythrina, said alkaloid having a melting point of about 103–104° C. and $$[\alpha]_D^{29} + 227.6°$$

in absolute ethanol, in the form of salts from the active free alkaloidal fraction obtained from *Erythrina subumbrans* (Haask.) Merrill which comprises the steps of dissolving the said alkaloidal fraction in absolute alcohol, treating the solution with the appropriate acidulating agent selected from the group consisting of hydriodic acid and hydrobromic acid, and crystallizing the erythramine salt from the liquor.

4. A process for the production of crystalline erythramine an alkaloid obtainable from certain botanically related species of Erythrina, said alkaloid having a melting point of about 103–104° C. and $$[\alpha]_D^{29} + 227.6°$$

in absolute ethanol, in the form of salts from the active free alkaloidal fraction obtained from *Erythrina subumbrans* (Hassk.) Merrill which comprises the steps of dissolving the said alkaloidal fraction in absolute alcohol, treating the solution with sodium iodide and glacial acetic acid and crystallizing the erythramine salt from the liquor.

5. A process for the production of erythramine the hydrobromide of an alkaloid obtainable from certain botanically related species of Erythrina, said alkaloid having a melting point of about 103–104° C., and $$[\alpha]_D^{29} + 227.6°$$

in absolute ethanol, from the active free alkaloidal fraction obtained from *Erythrina sandwicensis* Deg. which comprises dissolving the alkaloidal fraction in absolute alcohol, treating the solution with aqueous hydrobromic acid, and allowing the erythramine hydrobromide to crystallize from the liquor.

6. A substance selected from the group consisting of erythramine, an alkaloid obtainable from certain botanically related species of Erythrina, said alkaloid having a melting point of about 103–104° C.; and $$[\alpha]_D^{29} + 227.6°$$

in absolute ethanol; and hydrohalides of said alkaloid.

7. Erythramine, an alkaloid obtainable from certain botanically related species of Erythrina, said alkaloid having a melting point of about 103–104° C.; and $$[\alpha]_D^{29} + 227.6°$$

in absolute ethanol.

8. Hydrohalides of erythramine, an alkaloid obtainable from certain botanically related species of Erythrina, said alkaloid having a melting point of about 103–104° C., and $$[\alpha]_D^{29} + 227.6°$$

in absolute ethanol.

9. The hydriodide of erythramine, an alkaloid obtainable from certain botanically related species of Erythrina, said alkaloid having a melting point of about 103–104° C.; and $$[\alpha]_D^{29} + 227.6°$$

in absolute ethanol, and said hydriodide having a melting point of about 249° C. and $$[\alpha]_D^{29} + 220.0°$$

in water.

10. A process for the production of crystalline erythramine an alkaloid obtainable from certain botanically related species of Erythrina, said alkaloid having a melting point of about 103–104° C. and $$[\alpha]_D^{29} + 227.6°$$

in absolute ethanol, and hydrohalides thereof from the active free alkaloidal fraction obtained from parts of the group of botanically related species of Erythrina, consisting of *E. sandwicensis* Deg. and *E. subumbrans* (Hassk.), which comprises the steps of dissolving the said alkaloidal fraction in alcohol, treating the solution with the appropriate acidulating agent selected from the group consisting of hydriodic acid and hydrobromic acid, crystallizing the erythramine hydrohalides from the liquor, dissolving said hydrohalides in water, alkalinizing the solution, and extracting with an organic solvent.

11. The hydrobromide of erythramine, an alkaloid obtainable from certain botanically related species of Erythrina, said alkaloid having a melting point of about 103–104° C.; and $$[\alpha]_D^{29} + 227.6°$$

in absolute ethanol, and said hydrobromide having a melting point of about 228° C., and $$[\alpha]_D^{26} + 203.2°$$

in water.

12. A process for the production of salts of erythramine from the active alkaloidal "free" fraction obtained from parts of the group of botanically related species of Erythrina consisting of *E. sandwicensis* Deg., and *E. subumbrans* (Hassk.), which comprises treating an alcohol solution of said alkaloidal fraction with an acidulating agent selected from the group consisting of hydriodic and hydrobromic acids.

KARL FOLKERS.
FRANK KONIUSZY.